Nov. 24, 1964 NAOYUKI OHARA 3,158,075
SINGLE-LENS REFLEX CAMERA
Filed May 29, 1961 3 Sheets-Sheet 3

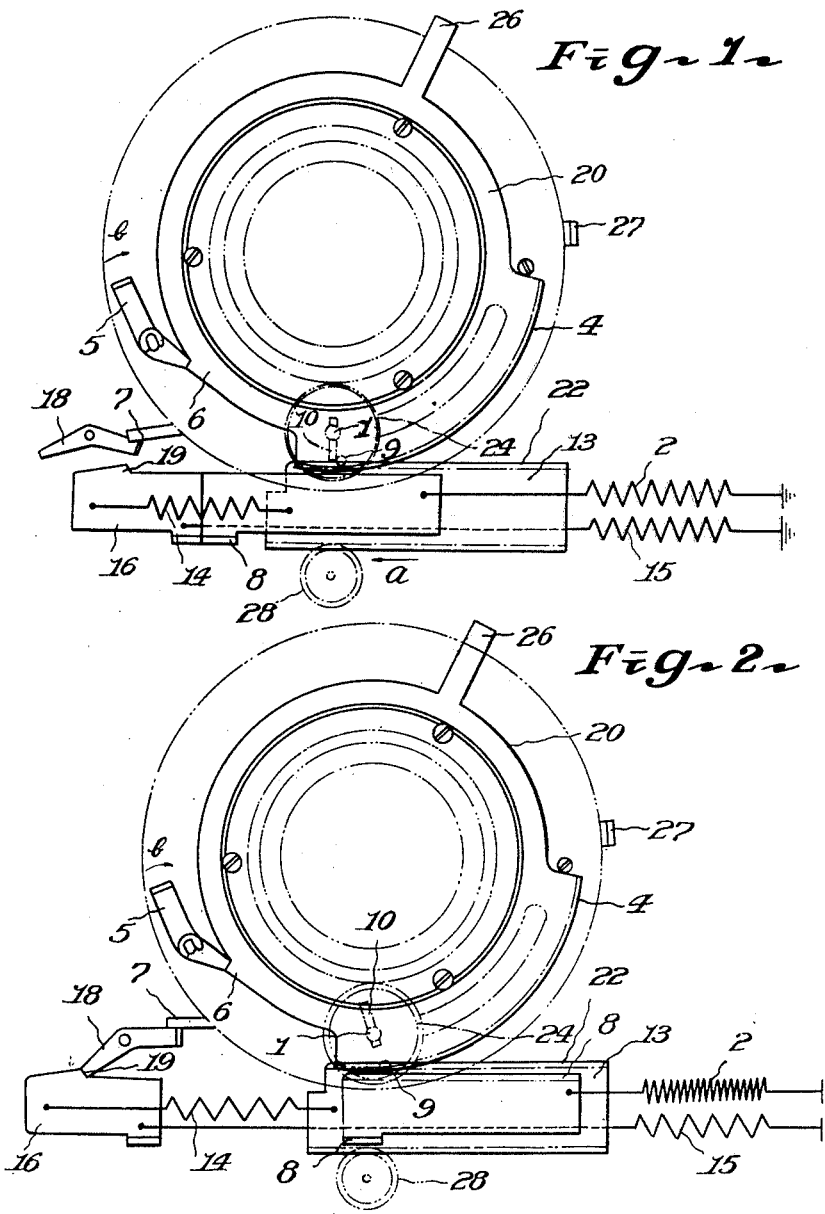

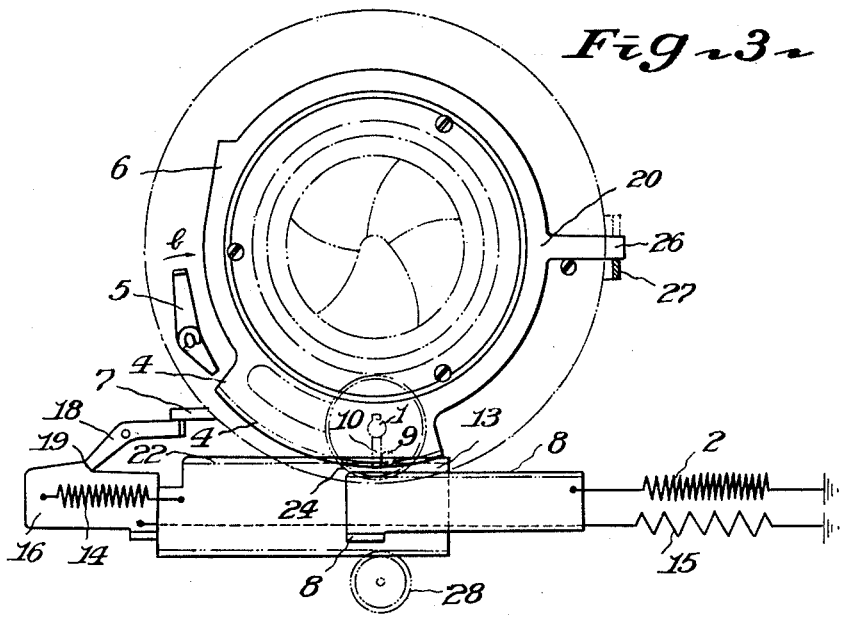
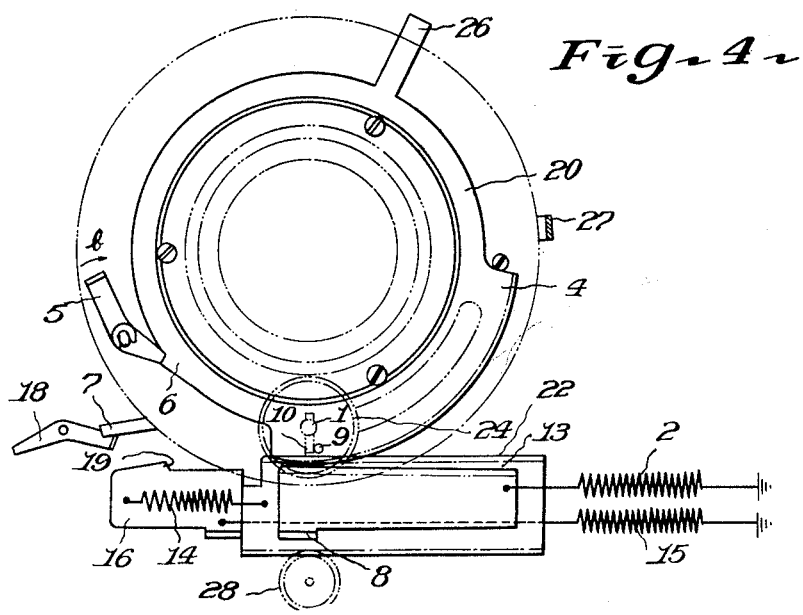

INVENTOR.
N. Ohara
BY
ATTYS.

United States Patent Office 3,158,075
Patented Nov. 24, 1964

3,158,075
SINGLE-LENS REFLEX CAMERA
Naoyuki Ohara, 436 1-chome, Soshigaya, Setagaya-ku, Tokyo-to, Japan
Filed May 29, 1961, Ser. No. 113,175
Claims priority, application Japan, June 1, 1960, 35/26,156
4 Claims. (Cl. 95—42)

This invention relates to photographic cameras, and more particularly it relates to single-lens reflex cameras of the type having such parts as a mirror, diaphragm, a mechanism for reciprocating the said mirror and diaphragm, and a shutter mechanism.

In a single-lens reflex camera, highly desirable features are the installation of an extremely simple reciprocating motion mechanism whereby a mirror, diaphragm, and, particularly in the case wherein a lens shutter is provided, shutter blades, film cover plate, etc., are caused to reciprocate in a good sequence, and possibility of observing through the finder an object to be photographed which is always bright regardless of whether the observation is desired prior to or subsequent to the photographic operation.

It is an object of the present invention to provide a new single-lens reflex camera having a basic member in the form of a reciprocating motion member which is convenient for installation within a camera, and which moves in a straight line.

It is another object of the invention to provide a camera as stated above having, in addition, a mirror which moves interrelatedly with the above-mentioned, reciprocating motion member.

It is yet another object of the invention to provide a single-lens reflex camera as stated above wherein two rings are installed within the lens system to form the diaphragm adjusting member of the lens, one of the said rings being directly coupled to a setting ring for presetting, and the other said ring being connected directly or indirectly to the aforesaid reciprocating motion member; and a mechanism whereby the diaphragm which has been fully opened during focus adjustment is constricted, by the movement of the latter ring mentioned above, to the preselected diaphragm aperture at the time of photographing, or the reverse operation is caused, is provided.

It is a further object of the invention to provide a single-lens reflex camera as afore-stated wherein two elastic springs which are power sources for causing reciprocating motion of the aforesaid reciprocating motion member are stretched simultaneously during the shutter charging or cocking operation; simultaneously with the camera release, one of the said springs is released, and the reciprocating motion member undergoes "Go motion" or operating motion, during which it causes such members as one of the diaphragm adjusting rings, mirror, and, particularly in the case wherein a lens shutter is installed, the film cover plate and shutter blades to undergo a series of motions in a positive manner, the shutter being released at the end of this "Go motion"; and the other of the aforesaid two springs is released by the movement of a member which indicates completion of the movement of the shutter (completion of the opening and closing of the shutter blades in the case of a lens shutter, and completion of the travel of the rear curtain in the case of a focal-plane shutter), whereby the aforesaid reciprocating motion member is caused to undergo "Return motion," and such members as the mirror and diaphragm are also caused to undergo "Return" motion which is counter to the "Go" motion.

The manner in which the foregoing as well as other objects and attendant advantages may best be achieved will be understood more fully from a consideration of the following detailed description, taken in conjunction with the accompanying drawings illustrating a representative embodiment of the invention as applied to a single-lens reflex camera with a lens shutter. In the accompanying drawings, throughout which the same and equivalent parts are designated by the same reference numerals:

FIG. 1 is a schematic diagram showing the condition of the reciprocating motion mechanism according to the invention at an intermediate instant during the shutter charging;

FIG. 2 is a schematic diagram of the mechanism of FIG. 1, showing its conditon at the completion of the shutter charging;

FIG. 3 is a schematic diagram of the mechanism of FIG. 1, showing its condition during shutter release, but shutter blades are not opened yet;

FIG. 4 is a schematic diagram of the mechanism of FIG. 1, showing its condition upon completion of all movements of all parts of the camera.

Figure 5:
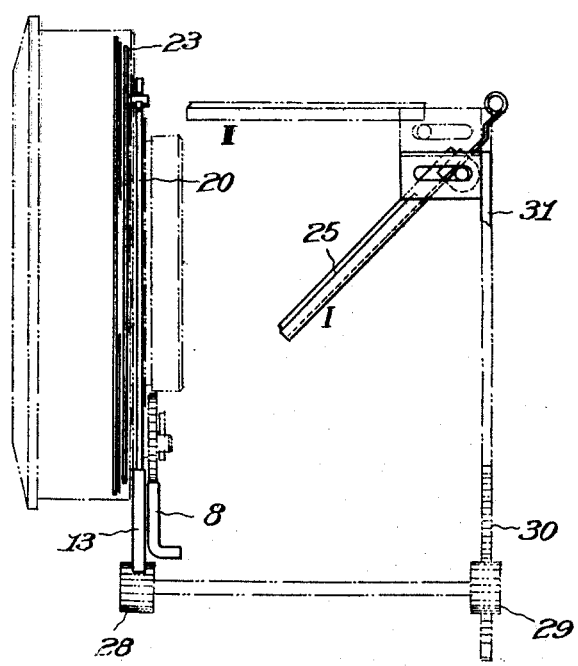
FIG. 5 is a side elevational view, showing an example of means of coupling, respectively, the diaphragm to the reciprocating motion mechanism and the mirror to the reciprocating motion mechanism.

Referring to the drawings, an operating ring 20 having gear teeth 4 on the outer periphery thereof and a reciprocating motion member 13 having rack teeth 22 are mutually enmeshed. The operating ring 20 is engaged also with a diaphragm adjusting ring 23 which is one of the two diaphragm adjusting rings within the lens system. The ring 20, basic member 13, and ring 23 are adapted to move together while maintaining constant, relative positions therebetween.

Referring now particularly to FIG. 1, if a cocking member 8 is moved in the direction of the arrow a, the cocking member 8 will push a movable piece 16 which constitutes the auxiliary member, causing it to move together therewith until a pawl 18 catches on a projection 19 of the movable piece 16 and will simultaneously cause a main spring of the shutter to stretch, thereby cocking the shutter. In the case illustrated wherein the invention is applied to a lens shutter, the cocking member 8 rotates a main shaft 1 in the clockwise direction as viewed in the drawing, by way of a gear 24, pins 9 and 10.

Since the movable piece 16 is moved toward the left, as viewed in the drawing, a spring 15 between the movable piece 16 and a fixed point on the camera frame and a spring 14 between the movable piece 16 and the reciprocating motion member 13 are stretched. A spring 2 between the charging member 8 and a fixed point on the frame, which is stretched by the leftward movement of the member 8, returns the member 8 to its initial position upon completion of the charging operation. During this operation, since a release lever 5 is engaged with a projection 6 of the operating ring 20, the ring 20 undergoes no movement whatsoever. Accordingly, the reciprocating motion member 13 and the diaphragm adjusting ring 23 also do not move, and the mirror 25, as shown in FIG. 5, is maintained in its lowered position I, the diaphragm is maintained in its fully opened condition, and the shutter blades, in the case of a lens shutter, are maintained in their opened condition. In undergoing the above-described operation, the various parts move from their respective conditions shown in FIG. 4 through those shown in FIG. 1 and reach those shown in FIG. 2.

Next, if the release lever 5 is rotated in the direction of the arrow b in FIG. 2, the operating ring 20 will be released from its locked condition, the reciprocating motion member 13 will be moved rapidly to the left, and the operating ring 20 which is engaged with the member 13 will be moved rapidly in the clockwise direction, by the spring 14. Accordingly, by the rotation of one diaphragm adjusting ring 23 which is engaged with the operating ring 20 as indicated in FIG. 5, the diaphragm will be constricted to the preset diaphragm aperture, and the mirror 25 which is connected by way of such intermediate members as pinions 28 and 29, rack 30 and up-downwardly slidable member 31 to the reciprocating motion member 13 will be caused by the movement of the member 13 to ascend to the position II (FIG. 5) in preparation for photographing operation. In the lens shutter (not shown), subsequent to temporary closing of the shutter blades, which have been open for the purpose of viewing the object to be photographed, the film cover plate, in addition to the mirror 25, is also moved to its position preparatory to photographing procedure by the movement of the member 13.

Then, at the terminal position of the rotation of the operating ring 20, a shutter release lever 27 is pushed by an arm 26 on the operating ring 20, whereby the shutter is released to expose the film. It will be obvious that, in this case, the same result may be obtained by releasing the shutter at the terminal position of the reciprocating motion member 13 rather than that of the operating ring 20. The positions of the various members within the camera at this time are as indicated in FIG. 3.

In the case of a conventional, single-lens reflex camera which does not have a reciprocating motion mechanism such as that described above, the entire operation of the camera is completed at the condition wherein the actual exposure for the purpose of photographing a picture is finished by the shutter releasing. For this reason, the mirror is left in its raised position, and it is impossible, of course, to view the photographic object through the view finder. Moreover, the diaphragm is left in its constricted condition.

In the camera of the present invention, on one hand, a signal lever 7, for indicating the completion of the operation of the shutter, operates to rotate the pawl 18 in the clockwise direction, thereby unlatching the pawl 18 from its engagement with the projection 19 and freeing the movable piece 16 from its locked condition. Of the two springs 14 and 15, each fixed at one end to the movable piece 16, the spring 14 is already relaxed, being in a condition subsequent to its having caused various parts to undergo "Go" or operating motion, but the spring 15 is yet in its stretched condition. Consequently, the movable piece 16 moves rapidly toward the right as its righthand end pushes the reciprocating motion member 13. As a result, the mirror 25, which is indirectly coupled to the member 13, descends to return to its initial position I as indicated in FIG. 5. In the case with a lens shutter, the film cover plate also returns to its position at which it covers the film.

Furthermore, the operating ring 20 rotates in the counterclockwise direction until its projection 6 engages with the release lever 5. During this movement the diaphragm adjusting ring 23 rotates in the same direction as the operating ring 20, causing the diaphragm to open from its preset aperture to its fully opened condition. At the same time, in the case with a lens shutter (not shown), the shutter blades are fully opened by the final portion of the movement of the operating ring 20.

Upon completion of the operation as described above, the entire operation of the single-lens reflex camera according to the present invention, is completed, and the various parts are in their respective conditions as indicated in FIG. 4.

It will be seen from the foregoing detailed description that the objects of the present invention are fully satisfied. The simple reciprocating motion member 13 of the present invention enables the series of movements of the diaphragm within the lens system, the mirror within the camera body, and, in the case of a camera with a lens shutter, the various mechanisms of such members as a film cover plate, to be accomplished easily and, at the same time, positively. Accordingly, instant-return-mirror types of single-lens reflex cameras, which tend to become complex in construction and, moreover, high in price, can be simplified in construction and lowered in price through embodiment of the present invention.

It will be appreciated, moreover, that the present invention may be applied not only to single-lens reflex cameras with lens shutters, but also, and possibly with greater facility, to single-lens reflex cameras with focal-plane shutters. Furthermore, the present invention may be easily utilized, by deletion of a few mechanisms, to single-lens reflex cameras which are not of the mechanisms, to single-lens reflex cameras which are not of the instant-return-mirror type.

Since it is obvious that many changes and modifications can be made in the foregoing details without departing from the nature and spirit of the invention, it is to be understood that the invention is not intended to be limited to the details described above except as set forth in the appended claims.

What is claimed is:

1. Photographic single-lens reflex camera having a shutter means, diaphragm means, a frame and a pivotally displaceable viewing mirror, which comprises a basic member operatively connected to the viewing mirror, and an auxiliary member, straight line path means provided in said frame having two ends, said basic and auxiliary members being positioned in end-to-end relationship along said straight line path means and being respectively movable along said straight line path, a first spring means connecting said members to bias said members toward each other, a second spring means connecting said auxiliary member and a fixed point on said frame at a point remote from said auxiliary member in the direction of said basic member, and a cocking means for displacing said auxiliary member along said path means to one end of its movable range, said first and second spring means being simultaneously tensioned by said displacement by said cocking means and said members, mean to release said basic member and means to release said auxiliary member, said first and second spring means and said basic and auxiliary members being so related that when said basic member is released said basic member is made to move by said first spring means toward said auxiliary member in one direction, and when said auxiliary member is released said basic member is made to move in the other direction by the movement of said auxiliary member under the influence of the said second spring means, thus achieving the reciprocating motion of said basic member and enabling said mirror for viewing to rise and fall and take a photograph.

2. A photographic camera according to claim 1, wherein an adjustable diaphragm adjusting ring is provided, said adjusting ring being operatively connected to the said basic member, whereby operation of said diaphragm is possible.

3. A single-lens reflex camera according to claim 1 provided with a release lever and a film cover plate operatively connected with the said basic member.

4. A single-lens reflex camera according to claim 1 provided with a release, an operating ring which is operatively connected to the said basic member to be rotated thereby, and being adapted to actuate said shutter whereby the shutter is opened supplementarily at the time of focal adjustment of the lens system of the camera.

References Cited in the file of this patent

UNITED STATES PATENTS 2,931,072    Yoshida                 Apr. 5, 1960
2,952,197    Goshima               Sept. 13, 1960